Feb. 22, 1949.　　　　R. C. WALLACE　　　　2,462,442
BRANCH HOLDER
Filed June 28, 1946
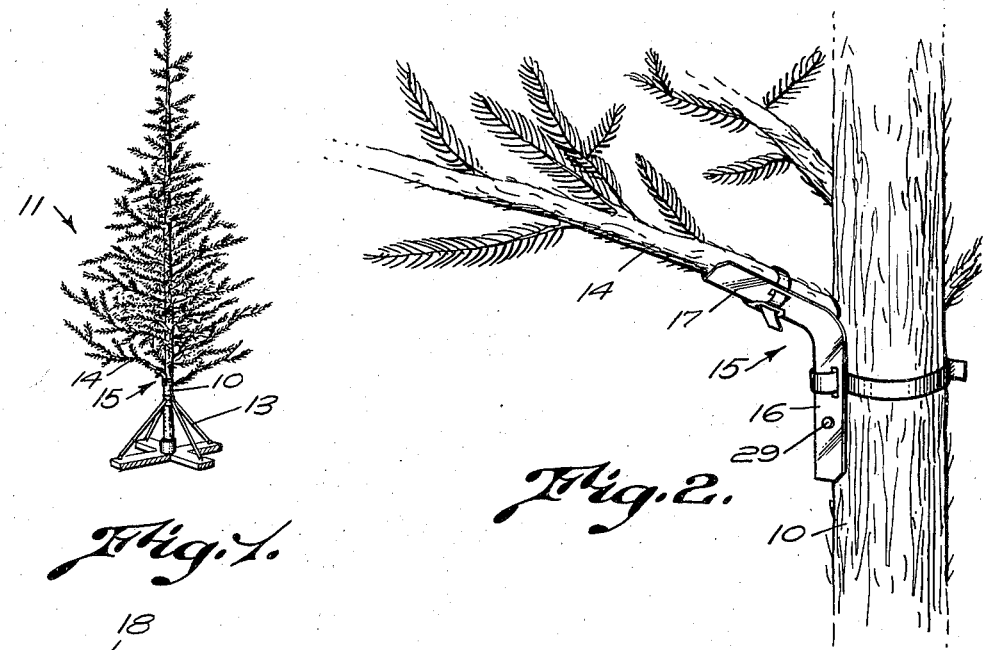
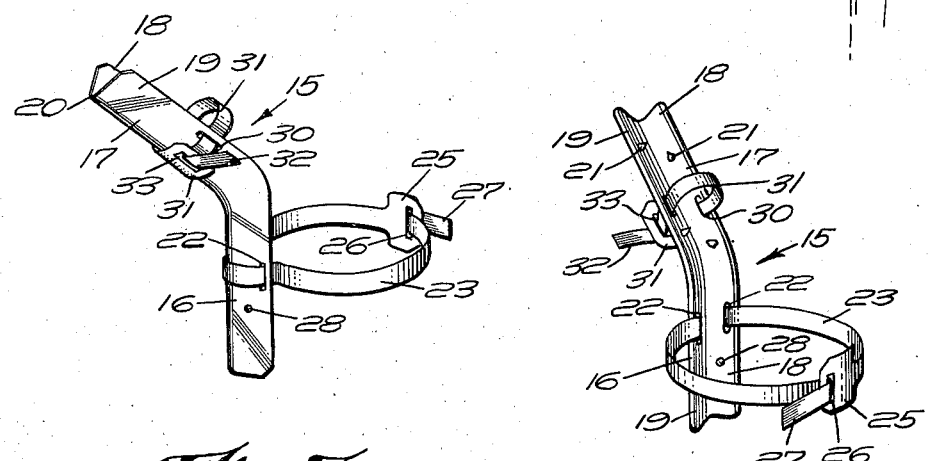
INVENTOR.
Raymond C. Wallace
BY Barlow & Barlow
Attorneys Patented Feb. 22, 1949

2,462,442

UNITED STATES PATENT OFFICE 2,462,442

BRANCH HOLDER

Raymond C. Wallace, East Providence, R. I.

Application June 28, 1946, Serial No. 680,009

2 Claims. (Cl. 248—42)

This invention relates to a tree device, more particularly a Christmas tree which is trimmed with ornaments to provide an ornamental display.

Quite frequently, a Christmas tree is not symmetrical. Some of its branches seem to emanate from the trunk at points which do not give the proper balance and it is quite frequent in the trimming of a Christmas tree to rearrange the branches by cutting them from the trunk at one point and attaching them to the trunk in some insecure make-shift manner at another location so as to make the tree more symmetrical.

One of the objects of this invention is to provide a bracket for attachment of the branch to the trunk of the tree which will be of simple construction and one which may be easily attached to the tree and to the branch at such point as may be desired.

Another object of this invention is to provide a bracket which will securely hold the branch to the trunk of the tree in the assembled relation desired.

Another object of this invention is to provide means for attaching the bracket to the tree trunk and the branch to the bracket in a simple and secure manner.

With these and other objects in view, the invention consists of certain novel features of construction, as will be more fully described and particularly pointed out in the appended claims.

In the accompanying drawings:

Fig. 1 is a perspective view of a Christmas tree having a branch attached therein with my improved bracket;

Fig. 2 is a perspective view on a larger scale illustrating the bracket as attached to the trunk of the tree and with a branch attached to the bracket to hold the same in place;

Fig. 3 is a perspective view of the bracket looking at the same from one point of view;

Fig. 4 is a perspective view looking at the bracket from another point of view.

In proceeding with this invention, I provide a bracket having arms which are angularly related, usually along the lines of an obtuse angle. A recess is provided in one arm of the bracket for the reception of the trunk of the tree and a recess is provided in the other arm for the reception of the branch which is to be secured in place. Suitable means are provided for attaching the bracket to the trunk and attaching a branch to the other arm of the bracket so as to hold these parts in secure relation.

With reference to the drawings, 10 designates a trunk of a Christmas tree which is designated generally 11 and which is provided with a base having supporting members 13 extending from the base to the lower part of the trunk of the tree. A branch such as 14 which has become detached from some other location along the trunk is desired to be secured to the trunk as shown in Fig. 2 in order to provide more symmetry to the tree and the bracket which I utilize for this purpose and which is the subject of this invention is designated generally 15 and is shown in perspective in Figs. 3 and 4.

This bracket 15 comprises an arm 16 for attachment to the trunk 10 of the tree and an arm 17 to which the branch 14 may be secured in order to hold this branch in desired position relative to the tree trunk. These arms 16 and 17 are disposed at an obtuse angle to each other and each consists of walls 18 and 19 which may be cast, molded or formed of sheet stock and disposed at an acute angle to each other to flare apart and form a V. A fillet such as 20 connects these two V-shaped walls as they converge. Detents or projections 21 are formed on the inner surface of the walls 18 and 19 so as to project into the branch and prevent rotation thereof.

In order to secure the arm 16 to the trunk 10, slots 22 are provided in each of the walls 18 and 19 and a flexible band 23 passes through these slots 22 to embrace the portion between the slots and then this band has its ends so formed as to be secured tightly about the trunk 10. The securing means consists of an enlarged portion 25 having a slot 26 through which the end 27 of the band may be passed so as to be bent back upon itself and when of metal will retain this bent back position to prevent the band from being unthreaded through the slot 26. In order to assist in securing this arm 16 to the tree trunk, an opening 28 may be provided through which a nail 29 may be placed.

The branch 14 may rest in the recess between the surfaces 18 and 19 of the arm 17 against the projections 21 which will assist in preventing relative rotation of the branch and bracket. Slots 30 are provided in this arm 17 and a strap 31 may be positioned through these slots 30 and buckled into position by means of the enlarged buckle 31 with the end 32 passing through the slot 33 in the buckle to be bent back upon itself to hold the same in locked position.

The bracket may be made either of metal such for instance as sheet metal or it may be molded from plastic in which latter event suitable thickness will be provided for strength equal to the desired strength required for the bracket.

I claim:

1. A branch holder for a tree comprising a bracket formed of angularly arranged arms each having a recess with flaring walls to receive a circular object therein and means to secure one of said arms of the bracket to a tree trunk and means to secure a branch to the other arm of the bracket, said first and second securing means each comprising a strap to embrace a portion of the tree, said strap passing through a slot in its arm.

2. A branch holder as set forth in claim 1 wherein each arm is provided with openings for the reception of a nail therethrough to assist in holding the bracket in position.

RAYMOND C. WALLACE.

REFERENCES CITED

The following references are of record in the file of this patent:

UNITED STATES PATENTS

| Number | Name | Date |
| --- | --- | --- |
| 130,863 | Pellett | Aug. 27, 1872 |
| 2,275,282 | Bigham | Mar. 3, 1942 |